May 10, 1949.    J. E. HELD    2,469,388
MULTIPLE LENS HAND TYPE OPHTHALMOSCOPE
Filed April 24, 1946    3 Sheets-Sheet 1

INVENTOR.
JOSEPH E. HELD
BY
F. J. Pisarra
ATTORNEY

May 10, 1949. J. E. HELD 2,469,388
MULTIPLE LENS HAND TYPE OPHTHALMOSCOPE
Filed April 24, 1946 3 Sheets-Sheet 2

INVENTOR.
JOSEPH E. HELD
BY
F. J. Pisarra
ATTORNEY

May 10, 1949.　　　　J. E. HELD　　　　2,469,388
MULTIPLE LENS HAND TYPE OPHTHALMOSCOPE
Filed April 24, 1946　　　　3 Sheets-Sheet 3
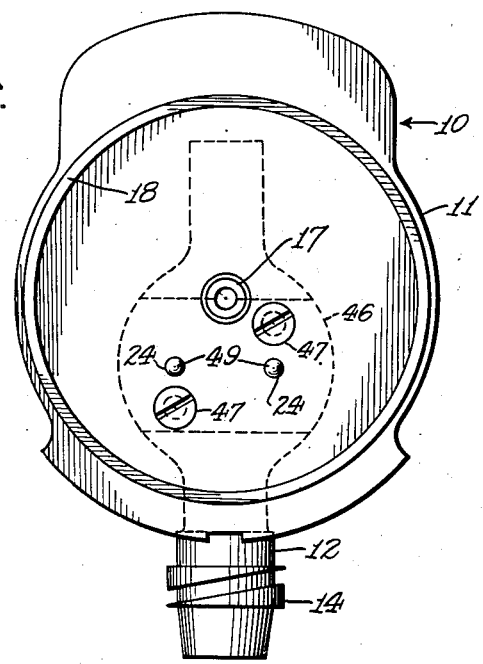
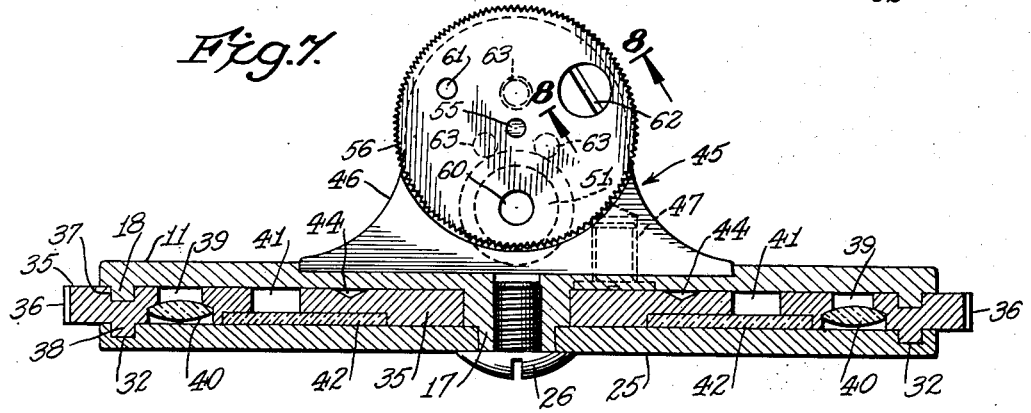
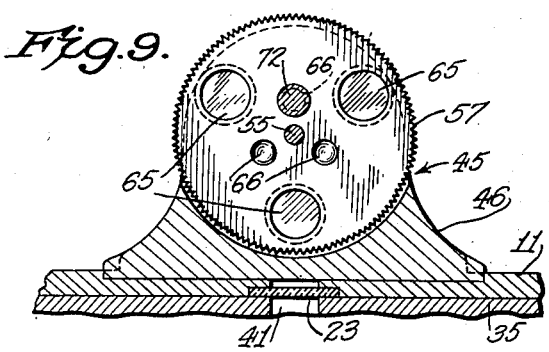
INVENTOR.
JOSEPH E. HELD
BY
F. J. Pisarra
ATTORNEY Patented May 10, 1949

2,469,388

UNITED STATES PATENT OFFICE 2,469,388

MULTIPLE LENS HAND TYPE OPHTHALMOSCOPE

Joseph E. Held, New York, N. Y., assignor to American Cystoscope Makers, Inc., New York, N. Y., a corporation of New York Application April 24, 1946, Serial No. 664,532

8 Claims. (Cl. 88—22)

1

This invention relates to optical instruments, and more particularly to ophthalmoscopes having improved features of construction.

Present day ophthalmoscopes generally include a supporting back plate, a cover plate spaced from the back plate, and a lens disc disposed between the back and cover plates and rotatable with respect thereto. The lens disc carries a series of spaced apart lenses arranged on a circle concentric with the axis of rotation of the disc and capable of being successively aligned with coaxial sight openings in the back and cover plates, respectively. The lens disc also carries a series of translucent indicia corresponding to the individual lenses and concentric with the axis of rotation of the disc. The indicia are successively placed in alignment with an indicia-viewing aperture in the cover plate upon rotation of the lens disc. Mounted on the back plate is an optical system including a lamp, a plurality of convex lenses and a reflecting prism for directing a beam of light in alignment with the sight apertures. The lamp of the optical system may also provide illumination for the indicia.

One of the principal objections to conventional ophthalmoscopes of the character outlined above is that dust, lint and other foreign particles in the atmosphere seep between either the back plate or cover plate and the lens disc and become deposited on the lenses of the lens disc, thereby obscuring vision therethrough and materially affecting the utility of the instrument. Objectionable foreign particles in the atmosphere also become deposited on these lenses by way of the sight openings in the back and cover plates. Additionally, the indicia become obscured in like manner. As a result of this condition, it is necessary that the instrument be dismantled periodically and cleaned.

The instant invention overcomes these objections by constructing and arranging the back plate, cover plate and lens disc in a manner to materially reduce or substantially eliminate the tendency of particles in the atmosphere to sift therebetween and become lodged on the lenses and the indicia, and by providing translucent seals across the aperture and openings through the plates. As will be apparent from the detailed description that follows, the structure contemplated herein also prevent foreign matter from entering the optical system from the front of the instrument and thereby reducing the effectiveness of the lamp and lenses contained therein.

An important feature of the invention resides in the provision of rotary means for controlling the size, shape and quality of the beam of light emanating from the optical system. This is accomplished by providing a pair of rotary discs that are spaced apart and mounted for rotation about a common axis and arranged in such a manner as to permit of their rotation by the same hand of the operator that holds the instrument. One of the discs is preferably interposed between the lamp and the convex lenses and carries a series of arcuately spaced inserts arranged to be successively positioned in the path of a beam of light from the lamp to the prism. The inserts are made of translucent materials having different chromatic properties whereby the beam of light, on being projected by the instrument, possesses the desired qualities. The other disc is interposed between the convex lenses and the reflecting prism and is provided with a series of arcuately spaced apertures differing in size and/or configuration whereby the size and shape of a "spot" of light cast by the beam of light projected by the instrument may be varied as required.

This pair of discs constitutes elements of a lens assembly which may be readily mounted in place as a unit, the individual parts being so arranged as to minimize the possibility of foreign particles being deposited on the convex lenses, lamp or prism, while permitting of rotation of each of the discs about their common axis. The lens assembly includes a pair of detents actuated by a single compression spring for yieldingly urging the detents into registry with corresponding depressions in the respective discs to restrain the discs against rotation when they are disposed in predetermined angular positions with respect to the convex lenses.

It is the primary object of the invention to provide an ophthalmoscope having its parts so arranged as to effectively minimize the possibility of foreign particles in the atmosphere becoming deposited on the lenses and/or identifying indicia carried by the lens disc of the instrument.

The invention has for an important object the provision of an ophthalmoscope having rotary means for selectively varying the size, shape and/or chromatic quality of a beam of light discharged thereby.

Another object of the invention is to provide an ophthalmoscope of the character indicated that may be conveniently held in one hand, and that has its parts so arranged as to permit of the manipulation of various control elements by the fingers of the same hand.

This invention has for a further object the provision of an ophthalmoscope that is simple, compact and sturdy in construction; that is reasonable in initial and maintenance costs; and that is capable of performing its intended functions in an effective and trouble-free manner.

The foregoing, as well as other objects, together with the advantages attainable by the practice of this invention, will be readily apparent to persons skilled in the art by reference to the following detailed description, taken in conjunction with the annexed drawings, that respectively describe and illustrate an arrangement of devices illustrative of a preferred embodiment of the invention.

In the drawings:

Figure 6 is a view in front elevation of a unitary support taken alone;

Figure 7 is an enlarged horizontal cross-sectional view taken along line 7—7 of Figures 2;

Figure 8 is a fragmentary cross-sectional view taken along line 8—8 of Figure 7; and Figure 9 is an enlarged horizontal cross-sectional view taken along line 9—9 of Figure 2 with parts omitted.

Figure 4:
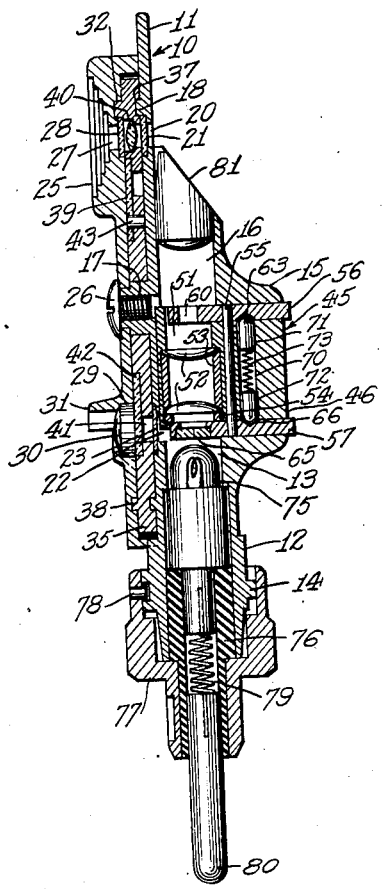
Figure 4 is a vertical cross-sectional view taken along line 4—4 of Figure 3.
Figure 5:
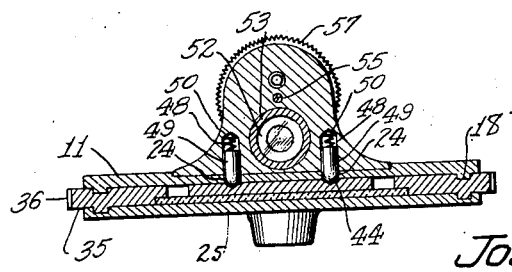
Figure 5 is a horizontal cross-sectional view taken along line 5—5 of Figure 2.

Referring now to the drawings, and more particularly to Figures 1-4, inclusive, the ophthalmoscope illustrated therein includes a preferably unitary support, generally indicated by numeral 10 and comprising a back plate 11; a base 12, having a central bore 13 and provided with external square threads at its lower portion 14; and a prism holder 15 having a passage 16 in alignment with bore 13 in the base. Integral with plate 11 and projecting forwardly thereof are an internally threaded hollow hub 17 and an annular tongue or extension 18 that is concentric with the axis of hub 17. Back plate 11 is provided with a plurality of through passages, including a sight aperture 20, directly above prism holder 15 and having a transparent sealing disc or window 21, and a passage 22 in light communication with bore 13 and having a transparent sealing disc or window 23 thereacross (Figure 4). Back plate 11 is also provided with a pair of detent passages 24, as is best shown in Figure 5.

A cover plate 25 is spaced forwardly of back plate 11 and is secured to hub 17 by a stud 26. The cover plate is provided with a sight opening 27 in axial alignment with sight aperture 20 and having a sealing disc or window 28 thereacross. Also formed in cover plate 25 is an indicia-viewing opening 29 that is closed at its outer end by a lens or window 30 that is sealed to the cover plate and is positioned below an arcuate hood 31. The rear surface of the cover plate is fabricated to obtain a circular groove or recess 32.

Figure 1:
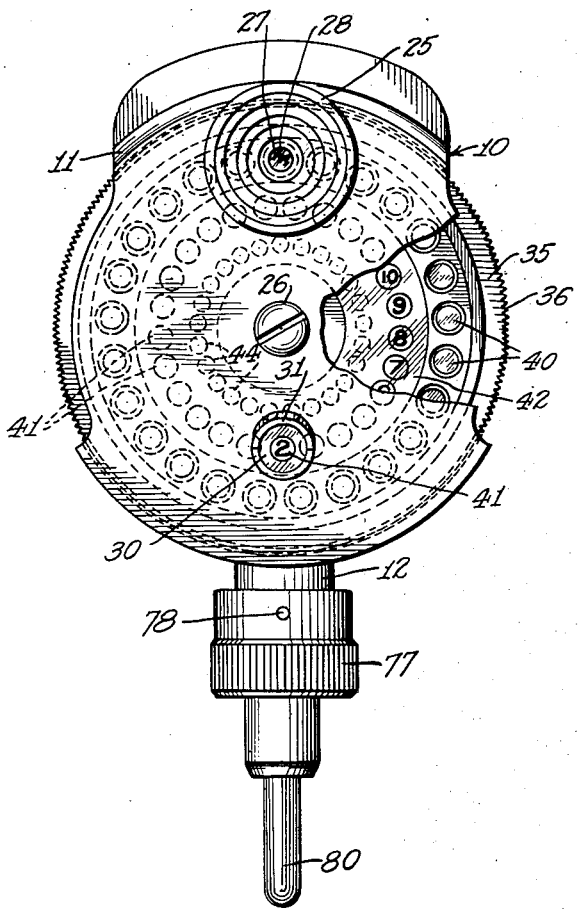
Figure 1 is a view in front elevation of an ophthalmoscope constructed in accordance with this invention.
Figure 2:
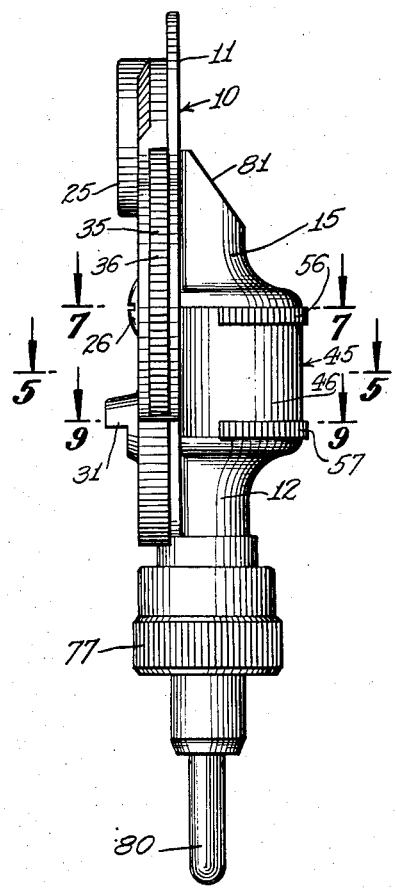
Figure 2 is a side view of Figure 1.
Figure 3:
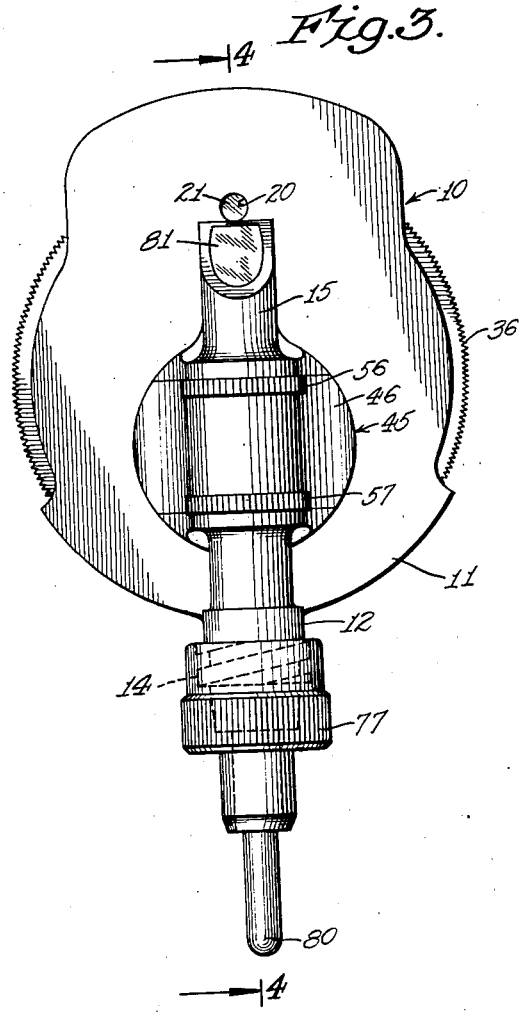
Figure 3 is a rear view of the ophthalmoscope shown in Figure 1 with parts in the lower portion thereof omitted for better illustration.

Intermediate back plate 11 and cover plate 25, and mounted for rotation about hub 17, is a lens disc 35 that is best shown in Figures 1, 4 and 7, to which reference is now had. This disc is provided with peripheral serrations 36 to facilitate imparting rotation thereto; is recessed to define a circular groove 37 concentric with the axis of hub 17; and carries a preferably integral forwardly projecting tongue or extension 38 that is also concentric with the axis of hub 17. As shown in Figures 4 and 7, tongues 18 and 38 register with grooves 37 and 32, respectively. The double tongue and groove arrangement just described is such as to permit of ready rotation of lens disc 35 with respect to both the back and cover plates, but at the same time effectively impedes particles of solid material that may be in the atmosphere from passing between either of the plates and the lens disc, and thence to surfaces of the lens disc or devices carried thereby that are positioned within the inner circumference of the tongues or the grooves. It has been ascertained that for all practical purposes the double tongue and groove arrangement shown in the drawings is sufficient to serve as a satisfactory barrier for the exclusion of solid particles from the interior of the instrument, providing, of course, that the parts are machined with a reasonable degree of accuracy. It is recognized, however, that additional tongue and groove arrangements concentric with those shown may be incorporated in the instrument, depending on the degree of effectiveness desired.

Lens disc 35 has a series of through apertures 39 arranged in spaced relationship about a circular arc that is concentric with the axis of rotation of the disc. Apertures 39 carry corresponding dioptrically different lenses 40 which are adapted to be brought successively into alignment with sight opening 27 in cover plate 25 and sight aperture 20 in back plate 11 upon rotation of disc 35. Also formed in disc 35 is a series of indicia apertures 41 corresponding in number to lens apertures 39 and arranged about a circular arc concentric with the axis of rotation of the disc. A circular translucent diopter dial 42 is inserted in a recess provided in the front face of disc 35, and contains a series of suitable indicia opposite corresponding indicia apertures 41, one of which indicia is denoted by "Figure 2" in Figure 1. A locating pin 43 (Figure 4), engaging disc 35 and diopter dial 42, insures proper mounting of the dial during assembly. As is best shown in Figures 5 and 7, the rearward face of disc 35 has a pair of relatively shallow detent recesses 44 that are adapted to register successively with detent passages 24 in back plate 11 upon rotation of disc 35.

Interposed between base 12 and prism holder 15 is a lens assembly generally represented by numeral 45 and having a main body 46 removably attached to back plate 11 by a pair of screws 47 (Figure 6). As is best shown in Figure 5, a pair of blind bores 48, drilled in body 46 and aligned with detent passages 24 in back plate 11, carries slidable detent pins 49 that are normally urged in an outward direction by compression springs 50 for registry with detent recesses 44 in lens disc 35. It will be observed that detent pins 49 register with particular detent recesses 44 of the series, depending upon the angular position of lens disc 35 with respect to back plate 11, to thereby yieldingly restrain the lens disc against rotation.

Body 46 is provided with a vertical through opening 51 (Figure 4), aligned with central bore 13 in body 12 and passage 16 in prism holder 15, and containing a pair of plano-convex lenses 52 that are maintained in predetermined spaced relation through the aid of a spacing sleeve 53 and an externally threaded retainer ring 54 that engages corresponding internal threads in body 46. Rotatable about the upper and lower end portions, respectively, of a vertical shaft 55, extending through body 46, are an aperture disc 56 and a filter disc 57, each of which is peripherally serrated, as shown, to facilitate manual rotation.

Referring now to Figures 7 and 8, disc 56 is formed with a series of spaced openings 60, 61 and 62 that are substantially equidistant from the axis of shaft 55. These openings differ from each other in one or more characteristics, such as cross-sectional area and/or configuration, whereby the size and shape of a "spot" of light projected by the instrument may be preselected at the will of the operator by rotating disc 56 so as to place a corresponding one of these openings in alignment with passage 51 in body 46. In the illustrated instrument, openings 60 and 61 are both circular in cross section, opening 60 being depicted in alignment with passage 51 (Figure 4), with the result that when the parts are in this relative position, the area of a "spot" of light projected by the instrument will be relatively greater than the area of the "spot" of light when smaller opening 61 is in alignment with passage 51. Opening 62 is in the nature of a substantially rectangular slit so as to obtain a "spot" of corresponding configuration when this opening is placed in service. The under surface of disc 56 is provided with a series of detent depressions 63 that cooperate with a detent means, to be described, for restraining disc 56 against rotation about its axis, depending upon the relative angular position of this disc with respect to passage 51.

Filter disc 57, illustrated in detail in Figure 9, carries a series of inserts 65 spaced from each other and equidistant from the axis of rotation of shaft 55. Each of these inserts is translucent and serves to control the chromatic quality of the beam of light projected by the instrument. For example, one of the inserts may be made of clear glass. Another of the inserts may filter out red components of light transmitted therethrough, while the remaining insert may filter out or modify some other component of the light transmitted therethrough. The upper surface of disc 57 has a series of detent depressions 66 formed therein, these depressions corresponding in number to the number of inserts carried by the disc, and being positioned equidistant from the axis of shaft 55.

Body 46 has a through detent passage 70 parallel to shaft 55 (Figure 4) and containing a pair of detent pins 71 and 72, adapted to respectively register with the detent depressions 63 in disc 56 and detent depressions 66 in disc 57. Pins 71 and 72 are normally and yieldingly urged upwardly and downwardly, respectively, through passage 70 due to the action of a single compression spring 73 arranged in this passage intermediate the pins.

An electric lamp 75 is supported in bore 13 by an insulating sleeve 76 that is maintained in position by an internally threaded coupling unit 77 engaging external threads 14 of base 12 and locked in the position illustrated in Figure 4 by a set screw 78. A compression spring 77 within sleeve 76 makes electrical contact with lamp 75 and a terminal 80 that is adapted to transmit electrical energy from a suitable source (not shown).

Mounted in prism holder 15 is a reflecting prism 81. As will be apparent from an examination of Figure 4, a beam of light emitted by lamp 75 passes upwardly through insert 65, lower plano-convex lens 52, upper plano-convex lens 52, passage 51, opening 60, passage 16 and reflecting prism 81, in the order named. Such a beam of light is substantially parallel to the axis of shaft 55. The beam is then cast by prism 81 in a direction toward the right, as viewed in Figure 4, and substantially in alignment with sight opening 27 and sight aperture 20. The size, shape and properties of the beam so projected will depend upon which of the openings 60, 61 or 62 in disc 56 and which of the inserts 65 in disc 57 are in service at a particular time. Some of the light rays emanating from lamp 75 pass through passage 22 and transparent seal 23 in back plate 11, and the opening 41 that is in alignment with passage 22, and thence to dial 42 to supply illumination to the corresponding indicia. By peering through lens 30, the operator may instantly determine which of the dioptrically different lenses 40 is in alignment with sight opening 27 and sight aperture 20 at that time.

Although the invention has been herein shown and described in simple and practicable form, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the appended claims.

I claim:

1. In an ophthalmoscope, a back plate having a sight aperture, a transparent window across said aperture, a cover plate spaced from said back plate and having a sight opening aligned with said sight aperture, a transparent window across said sight opening, a disc rotatably disposed between said plates and rotatable with respect thereto, a plurality of dioptrically different lenses carried by said disc and arranged to be brought successively into alignment with said sight opening and said sight aperture upon rotation of said disc, and means for preventing particles of foreign material in the atmosphere from passing between either of said plates and said disc and from being deposited on said lenses, said means comprising a continuous circular tongue, concentric with the axis of rotation of said disc, carried by one of said plates and registering with a groove formed in said disc and a like tongue carried by said disc and registering with a groove formed in the other of said plates.

2. In an ophthalmoscope, a back plate having a sight aperture, a transparent window across said aperture, a cover plate spaced from said back plate and having a sight opening aligned with said sight aperture, a transparent window across said sight opening, a disc disposed between said plates and rotatable with respect thereto, a plurality of dioptrically different lenses carried by said disc and arranged to be brought successively into alignment with said sight opening and said sight aperture upon rotation of said disc, and means for preventing particles of foreign material in the atmosphere from passing between either of said plates and said disc and from being deposited on said lenses, said means comprising a forwardly projecting continuous circular tongue integral with said back plate, concentric with the axis of rotation of said disc and registering with a corresponding groove formed in the rear portion of said disc and a like tongue projecting forwardly of said disc and registering with a corresponding groove in the rearward portion of said cover plate 3. In an ophthalmoscope, a back plate having a sight aperture, a transparent window across said aperture, a cover plate spaced from said back plate and having a sight opening aligned with said sight aperture, a transparent window across said sight opening, said cover plate having an indicia-viewing opening, a lens across said indicia-viewing opening, a disc rotatably disposed between said back and cover plates, a plurality of dioptrically different lenses carried by said disc and arranged to be brought successively into alignment with said sight opening and said sight aperture upon rotation of said disc, means carried by said disc and including a plurality of indicia corresponding to said lenses and arranged in an arc concentric with the axis of rotation of said disc for successive registry with said indicia-viewing opening upon rotation of said disc, and means for preventing particles of foreign material in the atmosphere from passing between either of said plates and said disc and from being deposited on said lenses and said indicia, said last mentioned means comprising a continuous circular tongue concentric with the axis of rotation of said disc, carried by one of said plates and registering with a groove formed in said disc and a like tongue carried by said disc and registering with a groove formed in the other of said plates.

4. In an ophthalmoscope, a back plate having a sight aperture, a transparent window across said aperture, a cover plate spaced from said back plate and having a sight opening aligned with said sight aperture, a transparent window across said sight opening, said cover plate having an indicia-viewing opening, a lens across said indicia-viewing opening, a lens disc rotatably disposed between said back and cover plates, a plurality of dioptrically different lenses carried by said disc and arranged to be brought successively into alignment with said sight opening and said sight aperture upon rotation of said disc, means carried by said disc and including a plurality of indicia corresponding to said lenses and arranged in an arc concentric with the axis of rotation of said disc for successive registry with said indicia-viewing opening upon rotation of said disc, and means for preventing particles of foreign material in the atmosphere from passing between either of said plates and said disc and from being deposited on said lenses and said indicia, said last mentioned means comprising a forwardly projecting continuous circular tongue integral with said back plate, concentric with the axis of rotation of said disc and registering with a corresponding groove formed in the rear portion of said disc and a like tongue projecting forwardly of said disc and registering with a corresponding groove in the rearward portion of said cover plate.

5. In an ophthalmoscope, a base, a back plate mounted on said base, a transparent window element carried by said back plate, a cover plate spaced from said back plate, a transparent window member carried by said cover plate and aligned with said window element, a lens plate rotatably disposed between said back and cover plates, a plurality of dioptrically different lenses carried by said lens plate and arranged to be brought successively into alignment with said window element and said sight member upon rotation of said lens plate, and coacting continuous circular tongue and groove means mounted on said plates and concentric with the axis of rotation of said lens plate, said means being disposed intermediate the front surface of the cover plate and the rear surface of the back plate for preventing particles of foreign material in the atmosphere from passing between adjacent plates and on said lenses.

6. In an ophthalmoscope, a base, a back plate mounted on said base and having a sight aperture, a transparent window across said aperture, a cover plate spaced from said back plate and having a sight opening aligned with said sight aperture, a transparent window across said sight opening, a lens plate rotatably disposed between said back and cover plates, a plurality of dioptrically different lenses carried by said lens plate and arranged to be brought successively into alignment with said sight opening and said sight aperture upon rotation of said lens plate, and coacting continuous circular tongue and groove means mounted on said plates and concentric with the axis of rotation of said lens plate, said means being disposed intermediate the front surface of the cover plate and the rear surface of the back plate for preventing particles of foreign material in the atmosphere from passing between adjacent plates and on said lenses.

7. In an ophthalmoscope, a base, a back plate mounted on said base, a transparent window element carried by said back plate, a cover plate spaced from said back plate, a transparent window member carried by said cover plate and aligned with said window element, a disc rotatably disposed between said back and cover plates, a plurality of dioptrically different lenses carried by said disc and arranged in an arc concentric with the axis of rotation of said disc for successive alignment with said transparent element and member upon rotation of said disc, means carried by said disc and including a plurality of indicia corresponding to said lenses and arranged in an arc concentric with the axis of rotation of said disc, lens means carried by said cover plate for viewing said indicia successively upon rotation of said disc, and coacting continuous circular tongue and groove means mounted on said plates and disc and concentric with the axis of rotation of said disc, said tongue and groove means being disposed intermediate the front surface of the cover plate and the rear surface of the back plate for preventing particles of foreign material in the atmosphere from passing between either of said plates and said disc and on said lenses and indicia.

8. In an ophthalmoscope, a base, a back plate mounted on said base and having a sight aperture, a transparent window across said aperture, a cover plate spaced from said back plate and having a sight opening aligned with said sight aperture, a transparent window across said sight opening, said cover plate having an indicia-viewing opening, a lens across said indicia-viewing opening, a disc rotatably disposed between said back and cover plates, a plurality of dioptrically different lenses carried by said disc and arranged to be brought successively into alignment with said sight opening and said sight aperture upon rotation of said disc, means carried by said disc and including a plurality of indicia corresponding to said lenses and arranged in an arc concentric with the axis of rotation of said disc for successive registry with said indicia-viewing opening upon rotation of said disc, and coacting continuous circular tongue and groove means mounted on said plates and disc and concentric with the axis of rotation of said disc, said tongue and groove means being disposed intermediate the front surface of the cover plate and the rear surface of the back plate for preventing particles of foreign material in the atmosphere from passing between either of said plates and said disc and on said lenses and indicia.

JOSEPH E. HELD.

REFERENCES CITED

The following references are of record in the file of this patent:

UNITED STATES PATENTS

| Number | Name | Date |
|---|---|---|
| 254,139 | Johnston | Feb. 28, 1882 |
| 1,507,447 | Winsnieski et al. | Sept. 2, 1924 |
| 1,631,329 | Patterson | June 7, 1927 |
| 1,795,691 | Wilson | Mar. 10, 1931 |
| 1,889,456 | Tillyer | Nov. 29, 1932 |
| 1,893,327 | Howell | Jan. 3, 1933 |
| 2,269,962 | Wappler | Jan. 13, 1942 |
| 2,370,514 | Arnesen | Feb. 27, 1945 |

FOREIGN PATENTS

| Number | Country | Date |
|---|---|---|
| 132,432 | Germany | July 8, 1902 |
| 331,862 | Great Britain | July 9, 1930 |